(12) United States Patent
Devall

(10) Patent No.: US 7,325,577 B2
(45) Date of Patent: Feb. 5, 2008

(54) TANK VENTING SYSTEM

(75) Inventor: Jeffrey E. Devall, Greenup, IL (US)

(73) Assignee: Stant Manufacturing Inc., Connersville, IN (US)

( * ) Notice: Subject to any disclaimer, the term of this patent is extended or adjusted under 35 U.S.C. 154(b) by 299 days.

(21) Appl. No.: 11/182,345

(22) Filed: Jul. 15, 2005

(65) Prior Publication Data

US 2006/0011257 A1    Jan. 19, 2006

Related U.S. Application Data

(60) Provisional application No. 60/589,146, filed on Jul. 19, 2004.

(51) Int. Cl.
  *B65B 31/00* (2006.01)

(52) U.S. Cl. ............... 141/59; 141/95; 141/198; 141/302; 123/520

(58) Field of Classification Search ............... 141/59, 141/95, 198, 301, 302; 123/516, 520; 137/43, 137/587
See application file for complete search history.

(56) References Cited

U.S. PATENT DOCUMENTS

| 4,193,383 | A | * | 3/1980 | Rogers | 123/520 |
| 4,790,349 | A | | 12/1988 | Harris | |
| 4,953,583 | A | | 9/1990 | Szlaga | |
| 5,156,178 | A | | 10/1992 | Harris | |
| 5,429,099 | A | * | 7/1995 | DeLand | 123/520 |
| 5,535,772 | A | * | 7/1996 | Roetker et al. | 137/43 |
| 5,603,349 | A | * | 2/1997 | Harris | 137/588 |
| 6,119,661 | A | * | 9/2000 | DeLand et al. | 123/520 |
| 6,170,510 | B1 | | 1/2001 | King et al. | |
| 6,578,597 | B2 | | 6/2003 | Groom et al. | |

* cited by examiner

*Primary Examiner*—Timothy L. Maust
(74) *Attorney, Agent, or Firm*—Barnes & Thornburg LLP

(57) ABSTRACT

A tank venting system includes a diaphragm valve movable to open and close a passageway leading to a fuel tank. The system also includes a fuel vapor recovery canister used to adsorb hydrocarbons associated with fuel vapor flowing through the passageway.

26 Claims, 5 Drawing Sheets

TANK VENTING SYSTEM

This application claims priority under 35 U.S.C. § 119(e) to U.S. Provisional Application Ser. No. 60/589,146, filed Jul. 19, 2004, which is expressly incorporated by reference herein.

BACKGROUND

The present disclosure relates to a vent apparatus, and particularly to a vent apparatus for regulating discharge of fuel vapor from a fuel tank and admission of air into the fuel tank. More particularly, the present disclosure relates to a system for managing fuel tank vacuum conditions during purging of hydrocarbons from an emission control system coupled to the fuel tank.

Vehicle fuel systems include valves associated with a fuel tank and configured to vent pressurized or displaced fuel vapor from the vapor space in the fuel tank to a vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

In addition, valves associated with fuel tanks are sometimes provided with vacuum-relief valves which open in response to onset of vacuum conditions in a vehicle fuel tank. When the temperature of the vehicle fuel tank drops, the fuel vapor pressure in the vehicle fuel tank can drop to a level lower than atmospheric pressure. A vacuum-relief valve is typically configured to allow air to enter the fuel tank, thereby returning the pressure in the fuel tank to an acceptable level.

SUMMARY

A tank venting system in accordance with the present disclosure includes a diaphragm valve movable to control air and fuel vapor flow between a canister passageway adapted to be coupled to a fuel vapor recovery canister and a tank passageway adapted to be coupled to a fuel tank. A first side of the diaphragm valve is exposed to fuel vapor extant in the canister and tank passageways and is movable to engage a valve seat associated with the passageways to block air and fuel vapor flow therebetween.

In illustrative embodiments, any diffused hydrocarbon material associated with fuel vapor in the canister and tank passageways that has diffused through pores extant in the diaphragm valve and exited through the pores opening on an opposite second side of the diaphragm valve will be adsorbed by a hydrocarbon filter located in an interior region bounded in part by the opposite second side of the diaphragm valve. A purge vacuum is applied periodically or intermittently to that interior region via a portion of the canister passageway to draw air through the hydrocarbon filter to purge diffused hydrocarbon material from the filter and deliver that purged diffused hydrocarbon material to an external fuel vapor recovery canister associated with the tank venting system.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
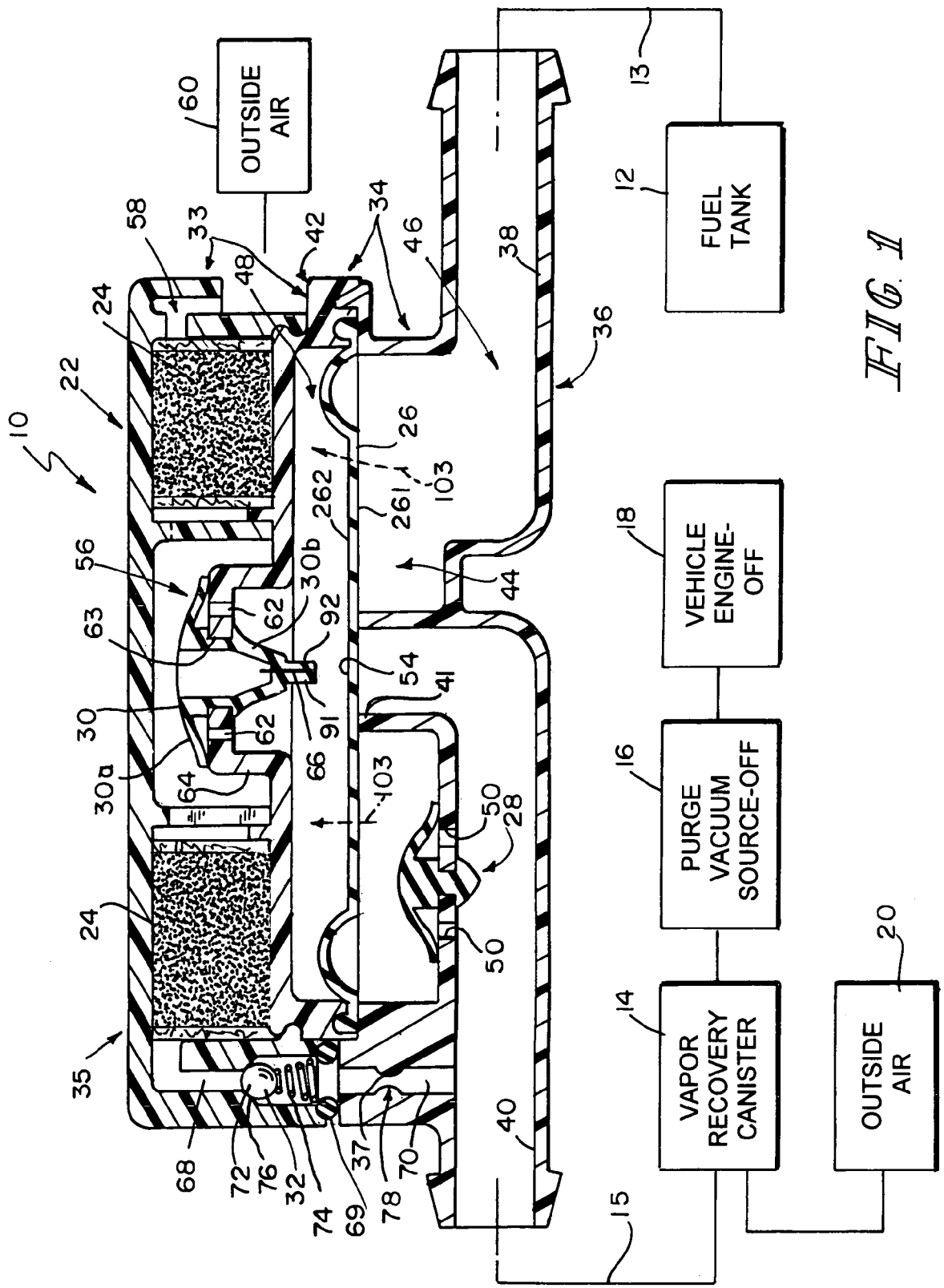
FIG. 1 is a sectional side view of a tank venting system including a vent apparatus in accordance with the present disclosure, a vapor recovery canister coupled to a canister passageway included in the vent apparatus, a purge vacuum source that has been turned off, a vehicle engine that has been turned off and is associated with the vapor recovery device, and a fuel tank coupled to a tank passageway included in the vent apparatus.

A tank venting system 10 is provided to control flow of air and fuel vapor between a fuel tank 12 and an emission control system including a vapor recovery canister 14. System 10 is used onboard a vehicle (not shown) including a purge vacuum source 16 coupled to a vehicle engine 18 and to canister 14. Canister 14 is exposed to outside air 20.

Tank venting system 10 includes a vent apparatus 22 coupled to fuel tank 12 via conduit 13 and vapor recovery canister 14 via conduit 15. Canister 14 is used to capture and store hydrocarbons entrained in fuel vapor discharged by vent apparatus 22. Canister 14 may be a carbon canister or other suitable fuel vapor treatment device.

Vent apparatus 22 includes a hydrocarbon filter 24, a diaphragm valve 26, an umbrella valve 28, an umbrella/duckbill valve 30, and a check valve 32 as shown, for example, in FIG. 1. These valves cooperate to manage flow of atmospheric air, vacuum, and pressurized fuel vapor through vent apparatus 22 while the vehicle carrying tank venting system 10 is at rest or in operation and also during purging of vapor recovery canister 14 to transfer hydrocarbons from canister 14 to vehicle engine 18 for combustion therein.

Vent apparatus 22 includes a housing 34 and a cover 35 mounted on housing 34 as suggested, for example, in FIG. 1. Housing 34 includes a base 36 formed to include a tank passageway 38 coupled in fluid communication to fuel tank 12 via conduit 13 and a canister passageway 40 coupled in fluid communication to canister 14 via conduit 15. In the illustrated embodiment, canister passageway 40 terminates at a valve seat 41 against which diaphragm valve 26 seats when moved to a flow-blocking position as shown in FIG. 1. It is within the scope of the present disclosure to form base 36 to include a valve seat for diaphragm valve 26 that is located at a fluid-conducting interface between tank and canister passageways 38, 40.

Housing 34 also includes a lid 42 coupled to base 36 to define therebetween a region 44 that is used, in certain instances, to communicate air, vacuum, and pressurized fuel vapor between canister passageway 40 and tank passageway 38. Base 36, lid 42, and cover 35 are all made of Acetal (POM) or other very low permeation material to block permeation of hydrocarbons through those parts to the atmosphere surrounding vent apparatus 22 so as to comply with various state and federal hydrocarbon emissions standards.

Figure 2:
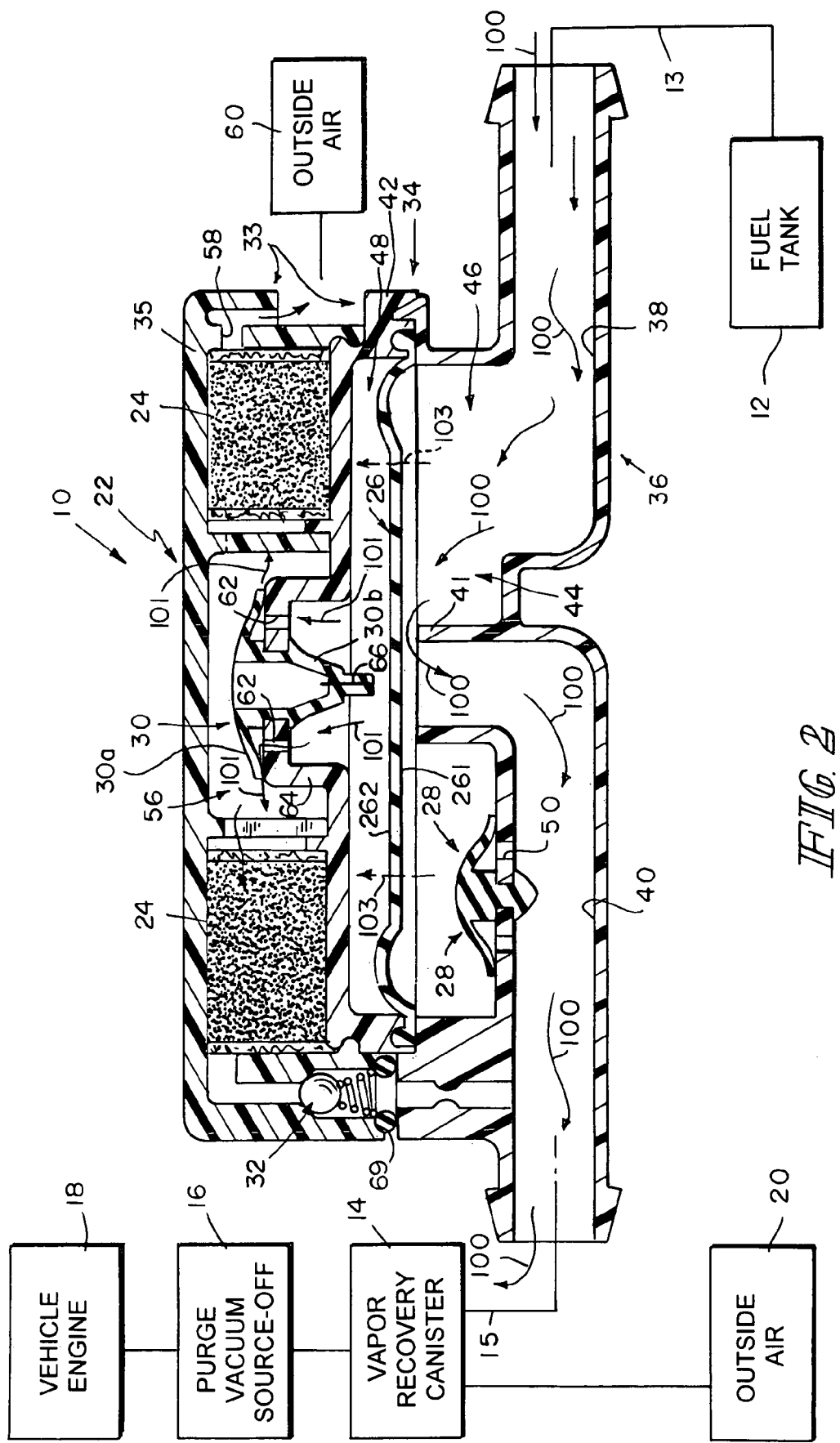
FIG. 2 is a view similar to FIG. 1 showing flow of pressurized fuel vapor through the vent apparatus (past a raised diaphragm valve) from the fuel tank to the vapor recovery canister to relieve unwanted pressure conditions that have developed in the fuel tank.

Diaphragm valve 26 is mounted in housing 34 to partition region 44 into a lower chamber 46 communicating with tank and canister passageways 38, 40 and an upper chamber 48 bounded by lid 42 as shown, for example, in FIG. 1. Diaphragm valve 26 is able to move, for example, from a closed position against valve seat 41 as shown in FIG. 1 to an opened position away from valve seat 41 as shown in FIG. 2. In one embodiment, diaphragm valve 26 is made of an elastomeric material and is trapped at its outer border between base 36 and lid 42. When diaphragm valve 26 is moved to its opened position, pressurized fuel vapor 100 can flow from fuel tank 12 to canister 14 via conduit 13, tank passageway 38, lower chamber 46, canister passageway 40, and conduit 15 as shown, for example, in FIG. 2.

Umbrella valve 28 is mounted on base 36 to control the flow of air, vacuum, and fuel vapor through one or more ports 50 formed in base 36 to conduct air, vacuum, and fuel vapor between canister passageway 40 and lower chamber 46. Normally, umbrella valve 28 is arranged to close ports 50 as shown, for example, in FIG. 1. In response to reduction of fuel vapor pressure in fuel tank 12 to below a predetermined level, umbrella valve 28 moves as shown, for example, in FIG. 3 to uncover ports 50. Ambient air 20 in canister passageway 40 can then flow through lower chamber 46 to reach fuel tank 12 via tank passageway 38 and conduit 13 to relieve unwanted vacuum conditions that have developed in fuel tank 12. Umbrella valve 28 is made of any of several rubber materials or the like.

Whenever a vacuum is applied to canister 14 by purge vacuum source 16 (to draw hydrocarbons stored in canister 14 into vehicle engine 18 for combustion therein), a vacuum will be applied to canister passageway 40. This vacuum will apply suction forces 52 to umbrella valve 28 (via ports 50) and to a center portion 54 of diaphragm valve 26 so as to retain umbrella and diaphragm valves 28, 26 in their closed positions as shown, for example, in FIG. 5. As a result, the "purge" vacuum cannot be applied to fuel tank 12 through tank passageway 38 of vent apparatus 22, thereby minimizing risk of deformation or other damage to fuel tank 12 during purging of hydrocarbons from vapor recovery canister 14.

Cover 35 is coupled to lid 42 as shown, for example, in FIG. 1 to provide a cover chamber 56 configured to receive hydrocarbon filter 24 therein. Hydrocarbon filter 24 comprises an activated charcoal field or bed of other suitable material designed to adsorb or otherwise attract hydrocarbon material. A vent port 58 is formed in cover 35 to admit outside air 60 into cover chamber 56.

Umbrella/duckbill valve unit 30 is mounted on lid 42 to control the flow of air and fuel vapor between cover chamber 56 in cover 35 and upper chamber 48 in lid 42. Valve unit 30 is made of a fluorocarbon or other very low permeation material to block permeation of hydrocarbons from upper chamber 48 into cover chamber 56 through valve unit 30.

Valve unit 30 includes an umbrella portion 30a that controls the flow of air and fuel vapor through one or more ports 62 formed in a raised dome 64 included in lid 42. Valve unit 30 also includes a duckbill portion 30b that controls the flow of air and fuel vapor through a passageway 66 formed by first and second flaps 91, 92 included in duckbill portion 30b that can open to couple upper chamber 48 and cover chamber 56 in fluid communication.

Figure 5:
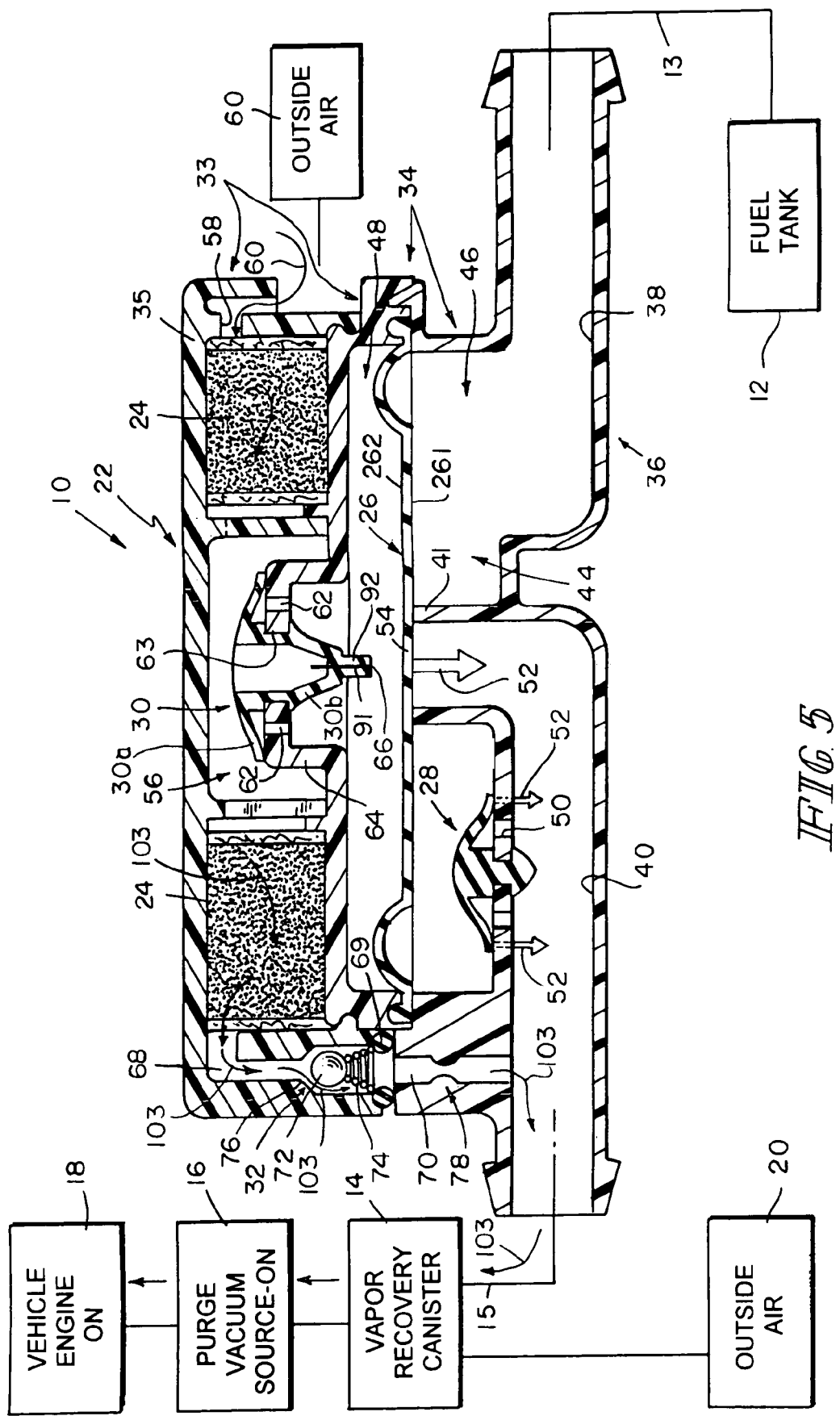
FIG. 5 is a view similar to FIGS. 1-4 showing "purging" of the vapor recovery canister which causes a vacuum to be applied to the canister and to the vent apparatus to transfer hydrocarbons from the canister to the engine and to cause (1) the umbrella and diaphragm valves to be drawn to and retained in closed positions to prevent such vacuum from being applied to the fuel tank and (2) flow of outside air through a hydrocarbon filter mounted in the vent apparatus and past an opened "ball-type" check valve into the vapor recovery canister to transfer any hydrocarbons extant in the hydrocarbon filter to the canister.

Fuel vapor discharged from cover chamber 56 can flow to vapor recovery canister 14 via a cover passageway 68 formed in cover 35, a base passageway 70 formed in base 36, canister passageway 40, and conduit 15 as suggested in FIG. 5. Check valve 32 is located in cover passageway 68 and includes, in the illustrated embodiment, a ball 72 and ball-biasing spring 74 for yieldably urging ball 72 normally against a seat 76 associated with cover passageway 68 to close cover passageway 68. Ball 72 and spring 74 are made, for example, of stainless steel. A reduced-diameter purge orifice 78 is provided in base passageway 70.

It is within the scope of this disclosure to use a vacuum-actuated regulator to provide check valve 32. A vacuum-actuated regulator 32 is mounted for movement from a normally closed position engaging valve seat 76 to an opened position disengaging valve seat 76. In the closed position, vacuum-actuated regulator 32 blocks flow of fuel vapor from hydrocarbon filter 24 into canister passageway 40 through vapor-conducting conduit 68, 70. In the opened position, vacuum-actuated regulator 32 is moved to allow flow of fuel vapor laden with diffused hydrocarbon material from hydrocarbon filter 24 into canister passageway 40 through vapor-conducting conduit 68, 70 upon exposure of canister passageway 40 to the purge vacuum.

Whenever a vacuum is applied to canister 14 by purge vacuum source 16, a vacuum will be applied to canister passageway 40 and to base and cover passageways 70, 68. This vacuum will apply a suction force to ball 72 to move ball 72 downwardly away from seat 76 to compress spring 74 and provide an "opening" so that any hydrocarbons extant on hydrocarbon filter 24 in cover chamber 56 will be drawn through passageways 68, 70, and 40 and delivered to canister 14 via conduit 15. This step will help to "clean" hydrocarbon filter 24.

The atmospheric side of diaphragm valve 26 in upper chamber 48 is vented by umbrella/duckbill valve unit 30 (two check valves working in opposite directions could effect the same results). The addition of valve unit 30 keeps upper chamber 48 at approximately atmospheric pressure, while keeping upper chamber 48 relatively tightly sealed and as valve unit 30 is made of a hydrocarbon permeation-resistant material, it becomes the main permeation block. This allows diaphragm valve 26 to be made of a more permeable, less expensive, elastomeric material.

After the umbrella/duckbill valve seal, there is a small chamber of activated charcoal that defines hydrocarbon filter 24 and adsorbs any hydrocarbons that permeate or diffuse past diaphragm valve 26 and umbrella/duckbill valve 30. As shown in FIG. 2, whenever excess pressure in fuel tank 12 causes diaphragm valve 26 to move upwardly away from seat 41, any fuel vapor 101 in upper chamber 48 is discharged from upper chamber 48 through ports 62 past an opened umbrella portion 30a and caused to flow through hydrocarbon filter 24. During this event, hydrocarbons in fuel vapor 101 are adsorbed onto charcoal included in filter 24.

When vacuum is present in lower chamber 46 below diaphragm valve 26, diaphragm valve 26 is drawn downwardly to engage seat 41. This downward motion of diaphragm valve 26 expands the volume in upper chamber 48 and, as a result, air 60 is drawn into upper chamber 48 via opened duckbill portion 30b of valve unit 30. Should there be any unwanted vacuum in fuel tank 12 from normal contradiction or fuel usage, this vacuum is "vented" by air flow from canister 14 via conduit 15, canister passageway 40, ports 50, lower chamber 46, tank passageway 38, and conduit 13.

During purging of vapor recovery canister 14, there is a vacuum on the "canister side" (e.g., canister passageway 40) of diaphragm valve 26. This causes diaphragm valve 26 to be moved to the closed position against seat 41 to prevent vacuum from reaching fuel tank 12 as shown, for example, in FIG. 5. Likewise, when sufficient in magnitude, opens ball check valve 32 and air is drawn from outside air 60 into the charcoal field in hydrocarbon filter 24 via vents 58 formed in cover 35. This air flow purges the hydrocarbons from the charcoal field and causes the hydrocarbons to be discharged via base passageway 70, canister passageway 40, and conduit 15 to canister 14.

Diaphragm valve 26 has a first side 261 exposed to fuel vapor extant in tank and canister passageways 38, 40 and an opposite second side 262 exposed to outside air. Diaphragm valve 26 is mounted for movement relative to base 36 to a closed position wherein first side 261 engages valve seat 41 to block flow of fuel vapor between tank and canister passageways 38, 40 and an opened position wherein first side 261 disengages valve seat 41 to allow flow of fuel vapor between tank and canister passageways 38, 40.

In illustrative embodiments, hydrocarbon recovery means is provided for receiving any diffused hydrocarbon material 103 associated with fuel vapor extant in tank and canister passageways 38, 40 that has diffused through pores extant in diaphragm valve 26 and exited through the pores opening on opposite second side 262 of diaphragm valve 26 as suggested diagrammatically in FIGS. 1 and 2. The illustrative hydrocarbon recovery means also discharges such diffused hydrocarbon material 103 into canister passageway 40 as suggested in FIG. 5 for delivery to vapor recovery canister 14 upon exposure of canister passageway 40 to a purge vacuum sufficient to apply a suction force 52 to first side 261 of diaphragm valve 26 to move diaphragm valve 26 to assume the closed position so that negative pressure extant in canister passageway 40 is not applied to fuel tank 12 via tank passageway 38.

In an illustrative embodiment, the hydrocarbon recovery means includes a shell 33 cooperating with base 36 to form an interior region bounded in part by second side 262 of diaphragm valve 26 and located to receive diffused hydrocarbon material 103 exiting diaphragm valve 26 through the pores opening in second side 262 of diaphragm valve 26. A vapor-conducting conduit 68, 70 having an inlet opening into the interior region formed in shell 33 and an outlet opening into canister passageway 40 is also included in the illustrative hydrocarbon recovery means. A hydrocarbon filter 24 is located in the interior region of shell 33 at the inlet of the vapor-conducting conduit 68, 70 to adsorb diffused hydrocarbon material 103 entrained in fuel vapor 101 flowing from the interior region of shell 33 through hydrocarbon filter 24 and vapor-conducting conduit 68, 70 into canister passageway 40 upon exposure of canister passageway 40 to the purge vacuum and application of the purge vacuum to the interior region of shell 33 via canister passageway 40, vapor-conducting conduit 68, 70, and hydrocarbon filter 24.

Shell 33 is formed to define valve seat 76 and an upper portion 68 of the vapor-conducting conduit 68, 70 opening into the interior region. Base 36 is formed to include a lower portion 70 of vapor-conducting conduits 68, 70 opening into canister passageway 40. Seal means 69 is provided for establishing a sealed connection between base 36 and shell 33 at a junction of upper and lower portions 68, 70 of the vapor-conducting conduit 68, 70 so that fuel vapor 101 laden with diffused hydrocarbon material 103 flows from upper portion 68 into lower portion 70 without leakage.

Lower portion 70 of vapor-conducting conduit 68, 70 has a first inner diameter as suggested in FIG. 1. In an illustrative embodiment, base 36 further includes a necked-down section or protuberance 37 extending into lower portion 68 of vapor-conducting conduit 68, 70 to provide a reduced-diameter purge orifice 78 having a second inner diameter that is less than the first inner diameter as also suggested in FIG. 1.

In illustrative embodiments, shell 33 includes a lid 42 coupled to base 36 and arranged to cooperate with second side 262 of diaphragm valve 26 to form an upper chamber 48 therebetween located to receive diffused hydrocarbon material 103 exiting diaphragm valve 26 through the pores opening on second side of diaphragm valve 26. Shell 33 also includes a cover 35 coupled to lid 42 to form a cover chamber 56 therebetween. Cover chamber 56 contains hydrocarbon filter 24 and communicates with vapor-conducting conduit 68, 70 via the inlet. Lid 42 is formed to include a port 62 arranged to conduct fuel vapor 101 extant in upper chamber 48 into cover chamber 56. At least a portion of hydrocarbon filter 24 is interposed between port 62 of lid 42 and the inlet of vapor-conducting conduit 68, 70 to intercept and adsorb diffused hydrocarbon material 103 entrained in fuel vapor 101 entering cover chamber 56 through port 62 formed in lid 42 and flowing toward the inlet of vapor-conducting conduit 68, 70.

Hydrocarbon purge means is provided for applying a purge vacuum to canister passageway 40 to apply the suction force 52 to first side 261 of diaphragm valve 26 to move diaphragm valve 26 to assume the closed position and for applying the purge vacuum to cover chamber 56 via canister passageway 40 and vapor-conducting conduit 68, 70 to draw outside air 60 into cover chamber 56 through a vent port 58 formed in shell and opened to outside air 64 surrounding shell 33 and then into hydrocarbon filter 24 to purge hydrocarbon material from hydrocarbon filter 24 and entrain the purged hydrocarbon material in fuel vapor drawn from cover chamber 56, vapor-conducting conduit 68, 70, and canister passageway 40 for delivery to a vapor-recovery canister 14 associated with canister passageway 40.

Intake valve means (represented illustratively by umbrella portion 30a) is provided for selectively conducting outside air and fuel vapor extant in cover chamber 56 into upper chamber 48 through an aperture 63 formed in lid 42 to maintain fuel vapor extant in upper chamber 48 at about atmospheric pressure. Discharge valve means (represented illustratively by duckbill portion 30b) normally closing port 62 formed in lid 42 is provided for allowing flow of fuel vapor containing diffused hydrocarbon material from upper chamber 48 through port 62 formed in lid 42 into cover chamber 56 to reach hydrocarbon filter 24 in response to movement of diaphragm valve 26 from the closed position to the opened position. A valve unit 30 is coupled to lid 42 to extend through aperture formed in lid 42. Valve unit 30 is made of a monolithic hydrocarbon permeation-resistant material and is configured to include discharge valve means 30a and intake valve means 30b. Diaphragm valve 26 is made of a hydrocarbon permeable elastomeric material formed to include pores through which hydrocarbon material is able to flow, and valve unit 30, lid 42, and base 36 are made of a hydrocarbon permeation-resistant material.

As suggested in FIG. 2, during refueling of fuel tank 12, pressure from fuel tank 12 lifts diaphragm valve 26 away from valve seat 41 to allow flow of fuel vapor 100 to vapor recovery canister 14. Fuel vapor 101 above diaphragm valve 26 contains diffused hydrocarbon material 103 that has passed through diaphragm valve 26 into upper chamber 48 and this fuel vapor 101 laden with diffused hydrocarbon material 103 is vented by umbrella portion 306 of valve unit 30 into cover chamber 56 to cause diffused hydrocarbon material to be adsorbed on hydrocarbon filter 14.

Figure 3:
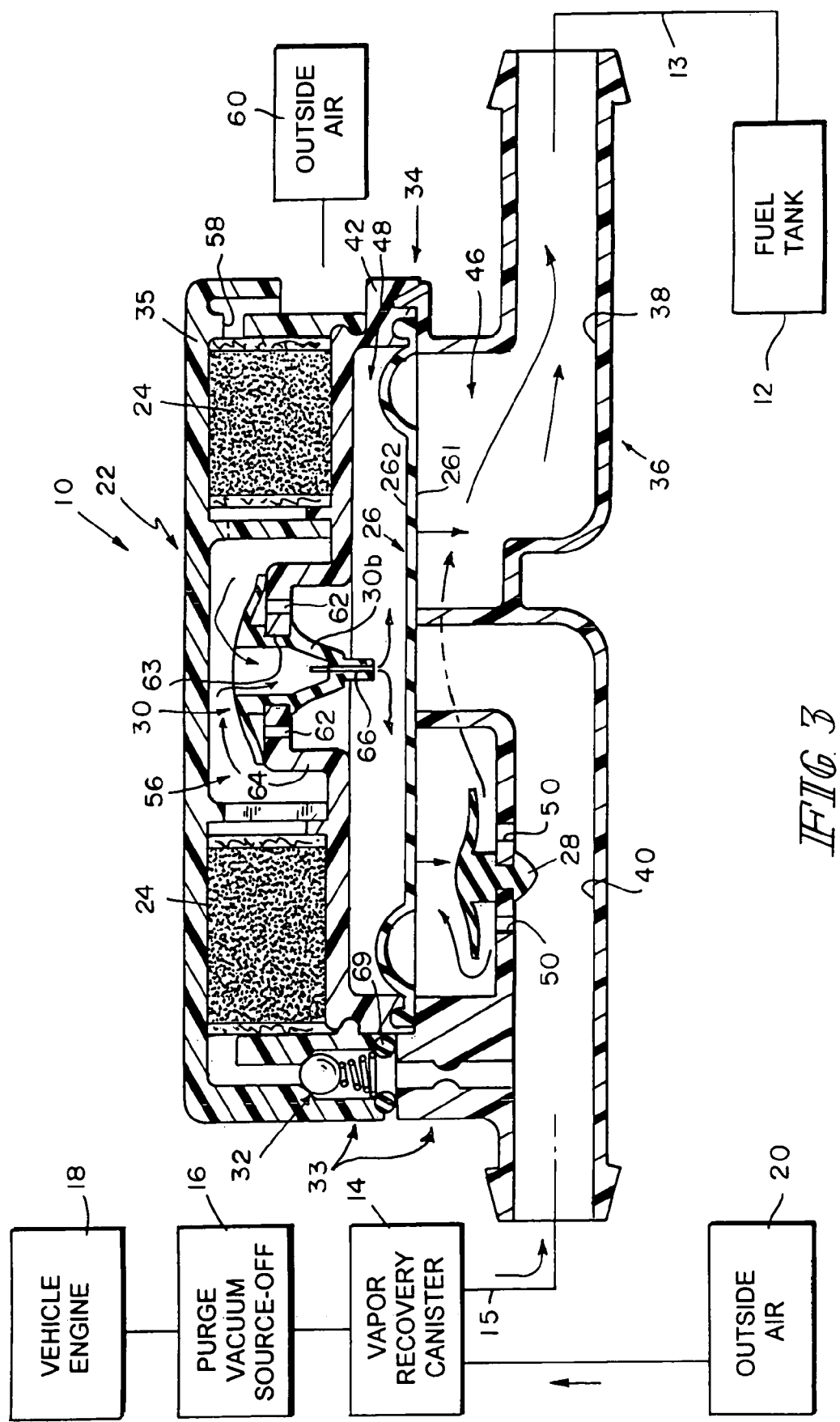
FIG. 3 is a view similar to FIGS. 1 and 2 showing flow of outside air through the vapor recovery canister and vent apparatus (past an opened umbrella valve) into the fuel tank to relieve unwanted vacuum conditions that have developed in the fuel tank.

As suggested in FIG. 3, when there is a vacuum in fuel tank 12, a main port at the fluid-conducting interface between tank and canister passageways 38, 40 is sealed by engagement of first side 261 of diaphragm valve 26 and valve seat 41. Outside air is drawn through duckbill portion 30b into upper chamber 48 and outside air 20 is conveyed to fuel tank 12 through ports 50 opened by umbrella valve 28.

Figure 4:
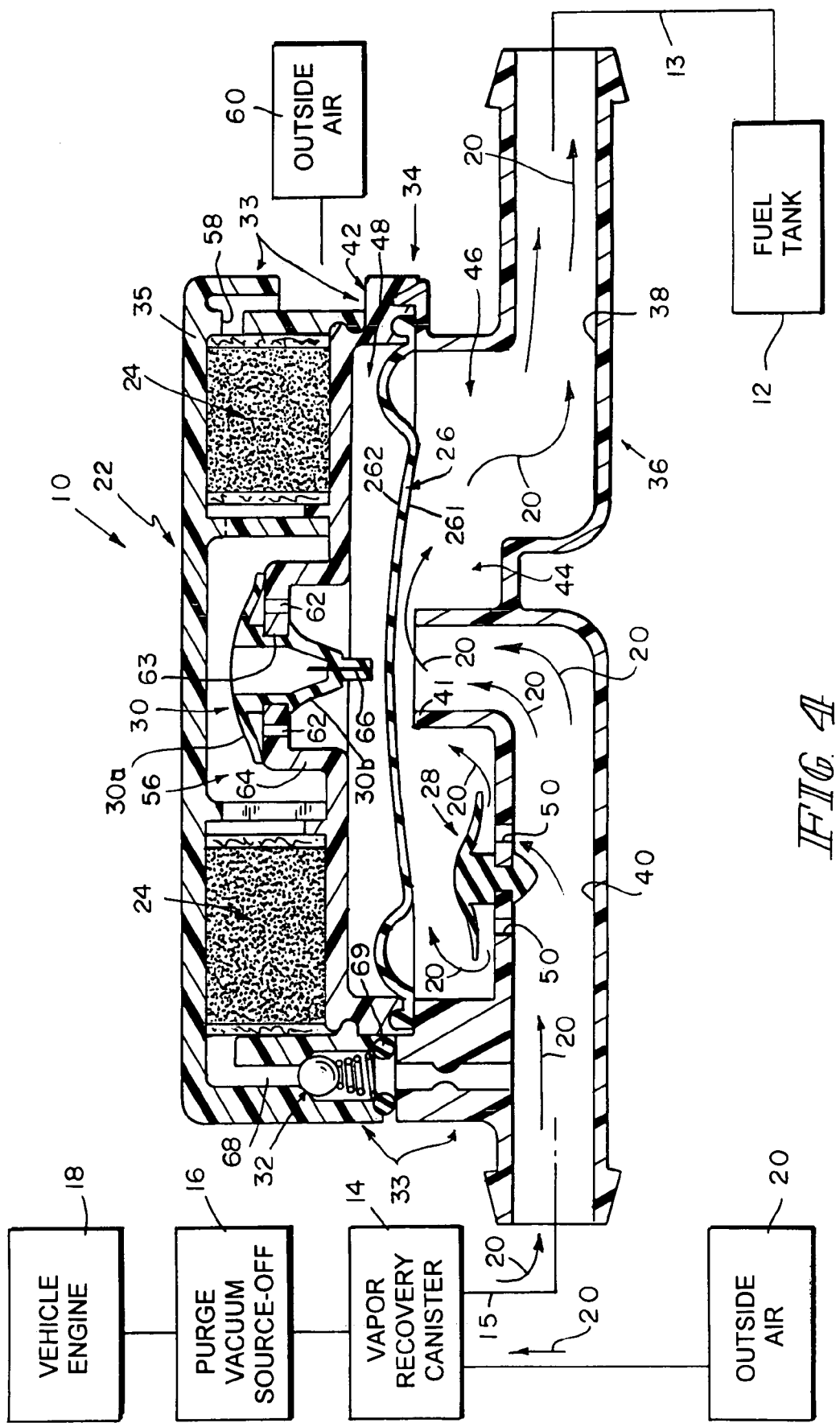
FIG. 4 is a view similar to FIGS. 1-3 showing flow of pressurized air and fuel vapor extant in the vapor recovery canister through the vent apparatus (past an opened umbrella valve and, perhaps, if the pressure is high enough, past an opened diaphragm valve) into the fuel tank.

As suggested in FIG. 4, pressure in vapor recovery canister 14 can flow to fuel tank 12 through ports 50 opened by umbrella valve 28. If that pressure is high enough, it could lift diaphragm valve 26 to an opened position.

As suggested in FIG. 5, when purge vacuum source 16 is on, umbrella valve 28 closes, diaphragm valve 26 closes, and check valve 32 opens. Opening check valve 32 allows flow of fuel vapor laden with diffused hydrocarbon material 103 that is drawn away from hydrocarbon filter 24 to vapor recovery canister 14.

The invention claimed is:

1. A tank venting system comprising
   a base formed to include a tank passageway adapted to be coupled in fluid communication to a fuel tank and a canister passageway adapted to be coupled in fluid communication to a vapor recovery canister and arranged to open into the tank passageway, the base also being formed to include a valve seat at a fluid-conducting interface between the tank and canister passageways,
   a diaphragm valve having a first side exposed to fuel vapor extant in the tank and canister passageways and an opposite second side exposed to outside air, the diaphragm valve being mounted for movement relative to the base to a closed position wherein the first side engages the valve seat to block flow of fuel vapor between the tank and canister passageways and an opened position wherein the first side disengages the valve seat to allow flow of fuel vapor between the tank and canister passageways, and
   hydrocarbon recovery means for receiving any diffused hydrocarbon material associated with fuel vapor extant in the tank and canister passageways that has diffused through pores extant in the diaphragm valve and exited through the pores opening on the opposite second side of the diaphragm valve and for discharging such diffused hydrocarbon material into the canister passageway for delivery to the vapor recovery canister upon exposure of the canister passageway to a purge vacuum sufficient to apply a suction force to the first side of the diaphragm valve to move the diaphragm valve to assume the closed position so that negative pressure extant in the canister passageway is not applied to the fuel tank via the tank passageway.

2. The tank venting system of claim 1, wherein the hydrocarbon recovery means includes a shell cooperating with the base to form an interior region bounded in part by the second side of the diaphragm valve and located to receive diffused hydrocarbon material exiting the diaphragm valve through the pores opening in the second side of the diaphragm valve, a vapor-conducting conduit having an inlet opening into the interior region and an outlet opening into the canister passageway, and a hydrocarbon filter located in the interior region at the inlet of the vapor-conducting conduit to adsorb diffused hydrocarbon material entrained in fuel vapor flowing from the interior region through the hydrocarbon filter and the vapor-conducting conduit into the canister passageway upon exposure of the canister passageway to the purge vacuum and application of the purge vacuum to the interior region via the canister passageway, vapor-conducting conduit, and hydrocarbon filter.

3. The tank venting system of claim 2, wherein the hydrocarbon recovery means further includes a valve seat associated with the vapor-conducting conduit and a vacuum-actuated regulator mounted for movement from a normally closed position engaging the valve seat to block flow of fuel vapor from the hydrocarbon filter into the canister passageway through the vapor-conducting conduit to an opened position disengaging the valve seat to allow flow of fuel vapor laden with diffused hydrocarbon material from the hydrocarbon filter into the canister passageway through the vapor-conducting conduit upon exposure of the canister passageway to the purge vacuum.

4. The tank venting system of claim 3, wherein the shell is formed to define the valve seat and an upper portion of the vapor-conducting conduit opening into the interior region, the base is formed to include a lower portion of the vapor-conducting conduit opening into the canister passageway, and the hydrocarbon recovery means further includes means for establishing a sealed connection between the base and the shell at a junction of the upper and lower portions of the vapor-conducting conduit so that fuel vapor laden with diffused hydrocarbon material flows from the upper portion into the lower portion without leakage.

5. The tank venting system of claim 4, wherein the lower portion of the vapor-conducting conduit has a first inner diameter and the base further includes a protuberance extending into the lower portion of the vapor-conducting conduit to provide a reduced-diameter purge orifice having a second inner diameter that is less than the first inner diameter.

6. The tank venting system of claim 2, wherein the shell includes a lid coupled to the base and arranged to cooperate with the second side of the diaphragm valve to form an upper chamber therebetween located to receive diffused hydrocarbon material exiting the diaphragm valve through the pores opening on the second side of the diaphragm valve and a cover coupled to the lid to form a cover chamber therebetween, the cover chamber contains the hydrocarbon filter and communicates with the vapor-conducting conduit via the inlet, the lid is formed to include a port arranged to conduct fuel vapor extant in the upper chamber into the cover chamber, and at least a portion of the hydrocarbon filter is interposed between the port of the lid and the inlet of the vapor-conducting conduit to intercept and adsorb diffused hydrocarbon material entrained in fuel vapor entering the cover chamber through the port formed in the lid and flowing toward the inlet of the vapor-conducting conduit.

7. The tank venting system of claim 6, wherein the hydrocarbon recovery means further includes hydrocarbon purge means for applying a purge vacuum to the canister passageway to apply the suction force to the first side of the diaphragm valve to move the diaphragm valve to assume the closed position and for applying the purge vacuum to the cover chamber via the canister passageway and the vapor-conducting conduit to draw outside air into the cover chamber though a vent port formed in the shell and opened to outside air surrounding the shell and then into the hydrocarbon filter to purge hydrocarbon material from the hydrocarbon filter and entrain the purged hydrocarbon material in fuel vapor drawn from the cover chamber, vapor-conducting conduit, and the canister passageway for delivery to a vapor-recovery canister associated with the canister passageway.

8. The tank venting system of claim 6, wherein the hydrocarbon recovery means further includes an umbrella/duckbill valve mounted on the lid and configured to provide umbrella valve means for controlling flow of fuel vapor containing diffused hydrocarbon material from the upper chamber through the port formed in the lid into the cover chamber to reach the hydrocarbon filter so that fuel vapor is able to flow from the upper chamber into the cover chamber whenever the diaphragm valve moves from the closed position to the opened position and duckbill valve means for controlling flow of outside air entering the cover chamber through the vent port into the upper chamber to maintain pressure in the upper chamber at about atmospheric pressure.

9. The tank venting system of claim 6, wherein the hydrocarbon recovery means further includes discharge valve means normally closing the port formed in the lid for allowing flow of fuel vapor containing diffused hydrocarbon material from the upper chamber through the port formed in the lid into the cover chamber to reach the hydrocarbon filter in response to movement of the diaphragm valve from the closed position to the opened position.

10. The tank venting system of claim 6, wherein the hydrocarbon recovery means further includes intake valve means for selectively conducting outside air and fuel vapor extant in the cover chamber into the upper chamber through an aperture formed in the lid to maintain fuel vapor extant in the upper chamber at about atmospheric pressure.

11. The tank venting system of claim 10, wherein the hydrocarbon recovery means further includes discharge valve means normally closing the port formed in the lid for allowing flow of fuel vapor containing diffused hydrocarbon material from the upper chamber through the port formed in the lid into the cover chamber to reach the hydrocarbon filter in response to movement of the diaphragm valve from the closed position to the opened position and a valve unit coupled to the lid to extend through the aperture formed in the lid and the valve unit is made of a monolithic hydrocarbon permeation-resistant material and is configured to include the discharge valve means and the intake valve means.

12. The tank venting system of claim 6, wherein the lid is formed to include a port opening into the upper and cover chambers and an aperture opening into the upper and cover chambers, a flow control valve unit arranged normally to close the port and the aperture and mounted for movement relative to the lid to open one of the port and aperture to regulate fuel vapor flow between the upper and cover chambers, the diaphragm valve is made of a hydrocarbon permeable elastomeric material formed to include pores through which hydrocarbon material is able to flow, and the flow control valve unit, lid, and base are made of a hydrocarbon permeation-resistant material.

13. The tank venting system of claim 1, wherein the hydrocarbon recovery means includes a hydrocarbon filter arranged to adsorb diffused hydrocarbon material and to lie in a filter passageway having an inlet receiving the diffused hydrocarbon material and an outlet opening into the canister passageway and hydrocarbon purge means for applying a purge vacuum to the canister passageway to apply the suction force to the first side of the diaphragm valve to move the diaphragm valve to the closed position and for applying the purge vacuum to the filter passageway via the canister passageway to draw air through the hydrocarbon filter to entrain hydrocarbon material adsorbed on the hydrocarbon filter into the air drawn through the hydrocarbon filter to produce a stream of fuel vapor moving through a portion of the canister passageway toward a vapor recovery canister associated with the canister passageway.

14. The tank venting system of claim 13, wherein the base is formed to include a port having an inlet opening into the canister passageway and an outlet opening into the tank passageway and further comprising a vacuum-relief regulator mounted for movement relative to the base from a normally closed position blocking flow of outside air entering the canister passageway through the port into the tank passageway to an opened position allowing flow of outside air entering the canister passageway through the port into the tank passageway when pressure in the tank passageway rises above a predetermined subatmospheric level.

15. A tank venting system comprising
a diaphragm valve movable to control air and fuel vapor flow between a canister passageway adapted to be coupled to a fuel vapor recovery passageway and a tank passageway adapted to be coupled to a fuel tank, a first side of the diaphragm valve being exposed to fuel vapor extant in the canister and tank passageways and being movable to engage a valve seat provided in a base formed to include the canister and tank passageways to block air and fuel vapor flow between the canister and tank passageways,
a shell coupled to the base and formed to include an interior region bounded in part by an opposite second side of the diaphragm valve, the shell further including a lid coupled to the base to cause the diaphragm valve to lie in a region formed between the lid and the base and to partition the region into a lower chamber bounded in part by the first side of the diaphragm valve and defined by the canister and tank passageways and an upper chamber bounded in part by the lid and the opposite second side of the diaphragm valve and located to receive diffused hydrocarbon material exiting through pores opening on the opposite second side of the diaphragm valve, and
a hydrocarbon filter located in the interior region outside of the upper chamber and configured to adsorb any diffused hydrocarbon material associated with fuel vapor in the canister and tank passageways that has diffused through pores extant in the diaphragm valve and exited through the pores opening on the opposite second side of the diaphragm valve.

16. The tank venting system of claim 15, wherein the base is formed to include a port having an inlet opening into the canister passageway and an outlet opening into the tank passageway and further comprising a vacuum-relief regulator mounted for movement relative to the base from a normally closed position blocking flow of outside air entering the canister passageway though the port into the tank passageway to an opened position allowing flow of outside air entering the canister passageway though the port into the tank passageway when pressure in the tank passageway rises above a predetermined subatmospheric level.

17. The tank venting system of claim 16, wherein the canister passageway terminates at the valve seat and the vacuum-relief regulator is arranged to underlie the first side of the diaphragm valve.

18. The tank venting system of claim 15, wherein the shell further includes a cover mounted on the lid to form a cover chamber containing the hydrocarbon filter, the lid is formed to include a port arranged to conduct fuel vapor extant in the upper chamber into the cover chamber to allow diffused hydrocarbon material entrained in the fuel vapor to reach the hydrocarbon filter, and further comprising discharge valve means normally closing the port formed in the lid for allowing flow of fuel vapor containing diffused hydrocarbon material from the upper chamber through the port formed in the lid into the cover chamber to reach the hydrocarbon filter in response to movement of the diaphragm valve from the closed position to the opened position.

19. The tank venting system of claim 18, wherein the lid is also formed to include an aperture separate from the port and further comprising intake valve means for selectively conducting outside air admitted into the cover chamber through a vent port formed in the cover into the upper chamber through the aperture to maintain fuel vapor extant in the upper chamber at about atmospheric pressure.

20. The tank venting system of claim 19, further comprising a valve unit coupled to the lid to extend through the aperture formed in the lid and the valve unit is made of a monolithic hydrocarbon permeation-resistant material and is configured to include the discharge valve means and the intake valve means.

21. The tank venting system of claim 15, wherein the shell further includes a cover mounted on the lid to form a cover chamber containing the hydrocarbon filter, the lid is formed to include an aperture to conduct outside air admitted in the cover chamber through a vent port formed in the cover into the upper chamber, and further comprising intake valve means for selectively conducting outside air and fuel vapor extant in the cover chamber into the upper chamber through the aperture formed in the lid to maintain fuel vapor extant in the upper chamber at about atmospheric pressure.

22. The tank venting system of claim 21, wherein the intake valve means is a duckbill valve having a mount portion coupled to the lid and arranged to extend though the aperture and a duckbill portion comprising mating first and second flaps that can be separated to open a passageway located between the flaps to couple the upper chamber and the cover chamber in fluid communication.

23. The tank venting system of claim 15, wherein the shell further includes a cover mounted on the lid to form a cover chamber containing the hydrocarbon filter, the lid is formed to include a port arranged to conduct fuel vapor extant in the upper chamber into the cover chamber to allow diffused hydrocarbon material entrained in the fuel vapor to reach the hydrocarbon filter, and further comprising hydrocarbon purge means for applying a purge vacuum to the cover chamber to draw air through the hydrocarbon filter to entrain hydrocarbon material adsorbed on the hydrocarbon filter into air drawn though the hydrocarbon filter to produce a stream of fuel vapor containing such hydrocarbon material and moving through a portion of the canister passageway toward a vapor recovery canister associated with the canister passageway.

24. The tank venting system of claim 23, wherein the purge vacuum is also applied to the canister passageway to apply a suction force to the first side of the diaphragm valve to move the diaphragm valve to the closed position so that negative pressure extant in the canister passageway is not applied to the fuel tank via the tank passageway.

25. The tank venting system of claim 15 further comprising means for transferring diffused hydrocarbon material adsorbed on the hydrocarbon filter through a portion of the canister passageway to a fuel vapor recovery canister associated with the canister passageway.

26. A tank venting system comprising
a vent apparatus including a housing and a cover mounted on the housing, the housing including a base formed to include a tank passageway adapted to be coupled to a fuel tank and a canister passageway adapted to be coupled to a vapor recovery canister and configured to terminate at a valve seat, the housing further including a lid coupled to the base to form a region therebetween,
the vent apparatus further including a diaphragm valve mounted in the housing to partition the region formed by the lid and the base into a lower chamber communicating with the tank and canister passageways and an upper chamber bounded in part by the lid, the diaphragm valve being mounted for movement relative to the base to a closed position engaging the valve seat to block flow of air and fuel vapor between the canister and tank passageways and an opened position disengaging the valve seat to allow flow of air and fuel vapor between the canister and tank passageways, the cover being coupled to the lid to form a cover chamber therebetween,
the vent apparatus further including a hydrocarbon filter located in the cover chamber, an umbrella valve mounted on the lid and configured to control discharge of fuel vapor laden with diffused hydrocarbon material that is associated with fuel vapor in the canister and tank passageways and has diffused through pores extant in the diaphragm valve and entered the upper chamber, a duckbill valve mounted on the lid and configured to admit outside air admitted into the cover chamber through a vent port formed in cover into the upper chamber to maintain the upper chamber at about an atmospheric pressure, a vapor-conducting conduit having an inlet opening into the canister passageway and an outlet opening into the cover chamber, and a check valve located in the vapor-conducting conduit and yieldably biased by a spring normally to assume a closed position blocking flow of fuel vapor from the cover chamber to the canister passageway through the vapor-conducting conduit, and
hydrocarbon purge means for applying a purge vacuum to the canister passageway to apply a suction force to the diaphragm valve to move the diaphragm valve to the closed position and to apply a suction force to the check valve to move the check valve against the spring to an opened position so that a vacuum is applied to the hydrocarbon filter to draw air through the hydrocarbon filter to entrain hydrocarbon material adsorbed on the hydrocarbon filter into air drawn through the hydrocarbon filter to produce a stream of fuel vapor containing such hydrocarbon material and moving through the vapor-conducting conduit and a portion of the canister passageway toward a vapor recovery canister associated with the canister passageway.

* * * * *